United States Patent [19]

Inoue

[11] Patent Number: 5,011,210
[45] Date of Patent: Apr. 30, 1991

[54] STRUCTURE FOR FIXING THE TERMINAL END OF CARPET IN AUTOMOTIVE SEAT

[75] Inventor: Nobuhiro Inoue, Akishima, Japan
[73] Assignee: Tachi-S Co. Ltd., Tokyo, Japan
[21] Appl. No.: 507,163
[22] Filed: Apr. 10, 1990
[51] Int. Cl.⁵ .............................................. B60R 5/00
[52] U.S. Cl. .................................. 296/69; 296/97.23; 296/37.16
[58] Field of Search ............... 296/37.16, 37.14, 97.23, 296/69; 297/378, 382, 112

[56] References Cited

U.S. PATENT DOCUMENTS 4,536,025  8/1985  Yamasaki et al. ............... 296/37.16
4,848,826  7/1989  Kuwabara et al. .............. 296/37.16

FOREIGN PATENT DOCUMENTS 249850  11/1986  Japan ............................... 296/37.16

Primary Examiner—Robert R. Song
Attorney, Agent, or Firm—Oldham & Oldham Co.

[57] ABSTRACT

A structure for fixing a carpet in an automotive seat, in which the terminal end of the carpet is firmly secured by a generally T-shaped anchor member into a recessed area formed in the rear side of a seat back of said seat, and anchor member being connected with the end of a covering member associated with the seat back.

6 Claims, 3 Drawing Sheets

STRUCTURE FOR FIXING THE TERMINAL END OF CARPET IN AUTOMOTIVE SEAT

1. FIELD OF THE INVENTION

The present invention relates to a structure for fixing the terminal end of carpet in an automotive seat, and particularly is directed to a structure for fixing the terminal end of carpet to the back wall of a seat back of an automotive seat which is turned into a load-carrying platform in parallel with a seat cushion for a load carrying purpose.

2. DESCRIPTION OF PRIOR ART

FIG. 1 shows an ordinary automotive seat of the type foldable forwardly into a load-carrying platform, in which its seat back (SB) is rotatable about a pivot (p) onto its seat cushion (SC), to thereby be transformed at its back wall into a platform on which a load or baggage is placed, and a carpet (1') which is extended from the rear deck of an automobile (not shown), is affixed over that back wall of the seat back (SB).

In this kind of seat, as shown in FIG. 2, there hitherto has been a structure for fixing the terminal end of the carpet (1') to the back wall of the seat back (SB). According thereto, there is formed a recessed area (41') in the upper portion of the seat back (SB) and along the back wall of the seat back (SB), is embedded a frame (4')which is recessed at the recessed area (41'). The frame (4') has, formed at its recessed area (41'), a projecting hook portion (42') extending part-way over the recessed area (41'). The end of the covering member (2') is sewn with a hook-like anchor member (3') having an engagement pawl (32'). The engagement pawl (32') is disposed within the recessed area (41') such as to embracingly engage the projected hook portion (42') of the frame (4'), whereby the end of the covering member (2') is fixed to the rear side of the seat back. The carpet (1') lies on the frame (4') and is firmly secured thereto by plural clips (12'). The terminal end (11') of the carpet (1') is inserted into the clearance (l) defined between the edge of the projected hook portion (42') and downwardly sloped region of the frame (4'). In that way, the terminal end (11') of the carpet (1') is set within the recessed area (11') and the clearance is closed.

However, due to its being merely inserted in the clearance (l), the terminal end (11') of the carpet is much easier to be removed therefrom, resulting in the carpet being turned up as indicated by the phantom line in FIG. 2, and consequently, the appearance of the seat back (SB), when folded onto the seat cushion (SC), becomes poor aesthetically with the turned up ends of the carpet's terminal end (11').

In this context, a technical person who deals in this industrial field is advised that the terminal end (11') of the carpet (1') can never or must not be firstly bonded to the recessed area (41), because the first step is the necessity to attain a space in which the engagement pawl (32a) or the end of the covering member (2) is inserted in order to be certainly engaged with the hook portion (42'), and thereafter, the clearance (l) being defined, the terminal end (11') of the carpet (1') is inserted thereto, as a second step.

SUMMARY OF THE INVENTION

In view of the above-stated drawbacks, it is thus a purpose of the present invention to provide an improved structure for fixing a capet in an automotive seat, which prevents the terminal end of the carpet from being removed and turned up from a securing point.

In achievement of the purpose, in accordance with the present invention, there is provided an anchor member of a generally T-shaped configuration in a section, which comprises a plate area and a hook-like portion projecting therefrom. Such anchor member is so arranged that the end of a covering member associated with a seat back of the seat is fixed to the plate area of the anchor member, and a securing portion is defined at one half section of the plate are of the same anchor member. Likewise as in the prior art, a recessed area is formed in the rear side of the seat back, and a stopper is provided at the recessed area, which is of an l-shaped configuration to be engaged with the hook-like portion of the anchor member.

Accordingly, the terminal end of the carpet is pressed and positively secured into the recessed area by means of the securing portion of the anchor member, thereby preventing removal of the terminal end of the carpet from the rear side of the seat back.

According to one aspect of the invention, the terminal end of the carpet is sandwiched and retained between the securing portion of the anchor member and an opposed wall of the recessed area, to thereby insure the positive securing of the terminal end of the carpet to the seat back. In another aspect of the invention, the recessed area is formed larger in order to permit easy insert of the carpet's terminal end into a clearance between the securing portion of the anchor member and the opposed wall of the recessed area. In that case, according to a second mode of the present invention, in addition to the back frame (4), there is another independent frame provided at the rear side of the seat back, on which a plate-like stopper is fixed for engagement with the hook-like portion of the anchor member.

DETAILED DESCRIPTION OF PREFERRED EMBODIMENTS OF THE INVENTION

Figure 3:
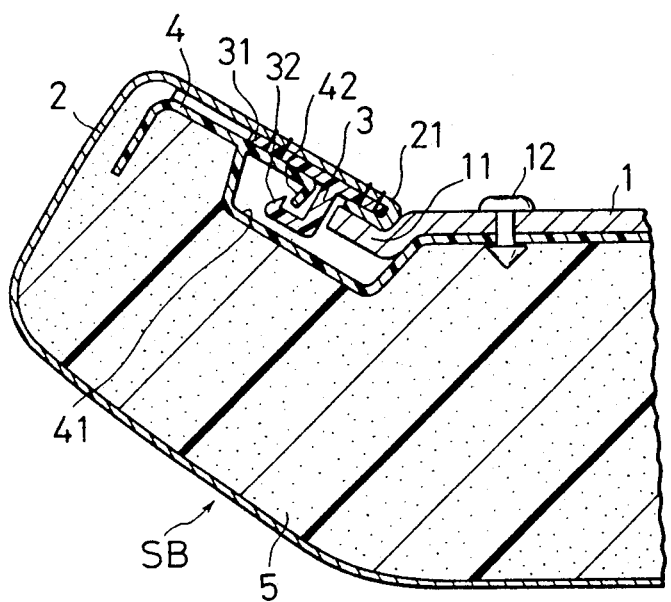
FIG. 3 is a partial sectional view of a structure as a first embodiment in accordance with the present invention.
Figure 4:
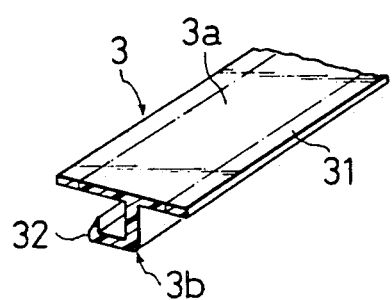
FIG. 4 is a perspective view of an anchor member used in the present invention.
Figure 5:
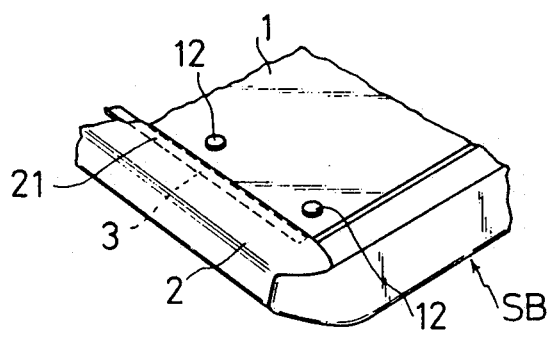
FIG. 5 is a partially broken, perspective view of a principal part of the invention.

Referring to FIGS. 3 through 5, there is shown a first embodiment of the present invention.

Figure 1:
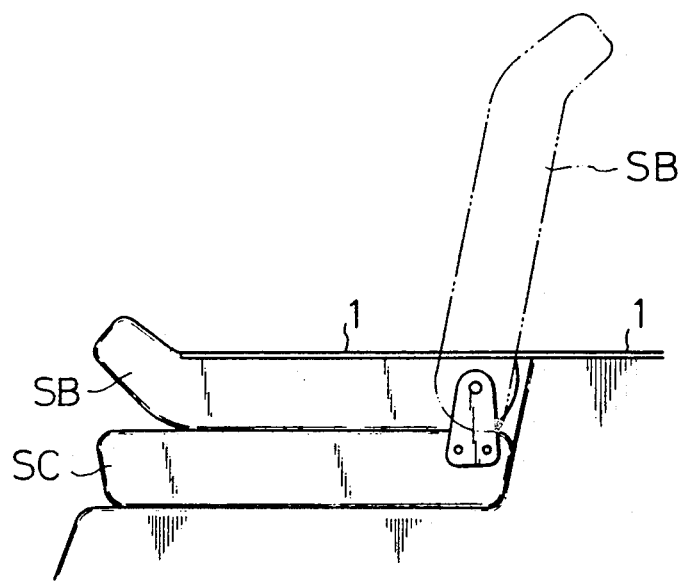
FIG. 1 is a schematic side view of a seat of the type In which its seat back is folded down, to thereby turn the rear side thereof into a load-carrying platform.
Figure 2:
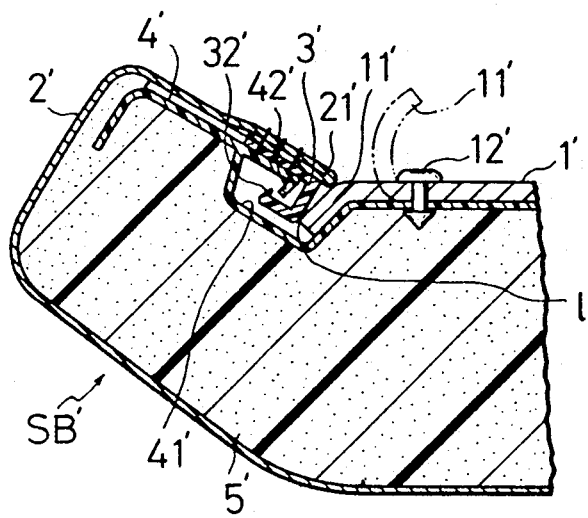
FIG. 2 is a partial sectional view of a conventional structure.

The present embodiment is based on the seat shown in FIG. 1, and designations therein correspond to the ones to be used in the following description.

Similar the previously stated prior art, in a seat back (SB), is embedded a frame (4) having a recessed area (41), and the end of a covering member (2) is sewn to an anchor member (3) which is formed in the recessed area (41).

Also, likewise in the prior art, an engagement pawl (32) which is an integral part of the anchor member (3,) is engages a projecting member in the form of a hook portion (42) of the frame (4). The frame (13) made of a hard synthetic resin material.

As best shown in FIG. 4, the anchor member (3) is made of a synthetic resin material and comprises a plate section (3a) of a rectangular shape, and a hook-like portion section (3b) terminating in the engagement pawl (32). The plate section (3a) is integral with a securing part (31) to be described later. Thus, the anchor member (3) assumes a generally "T"-shaped configuration in section.

The end of the covering member (2) is sewn to the plate section (3a) of the anchor member (3).

As can be seen from FIG. 4, the recessed area (41) extends on the rear side of said seat back (SB) in a direction transversely thereof, and thus, the anchor member (3) is formed in a length corresponding to that of the recessed area (41).

The carpet (1) lies on the frame (4) fixed to the back wall of the seat back (SB), and is secured by a plurality of clips (12) thereto.

Designation (5) denotes a foam cushion member of the seat back (SB) which is covered with the covering member (2).

With the above-described structure, the steps for realizing it consists of firstly placing the terminal end (11) of the carpet (1) into the recessed area (41) and secondly fitting pressingly the anchor member (3) into the recessed area (41) so that the engagement pawl (32) of the anchor member (3) is engaged wIth the hook portion (42) of the frame (4). Thus, the terminal end (11) of the carpet (1) is firmly sandwiched and retained between the securing part (31) of the anchor member (3) and the opposed downwardly extended wall of the recessed area (41) of the frame (4). Accordingly, The terminal end (11) is positively prevented from being removed from the recessed area (41).

Figure 6:
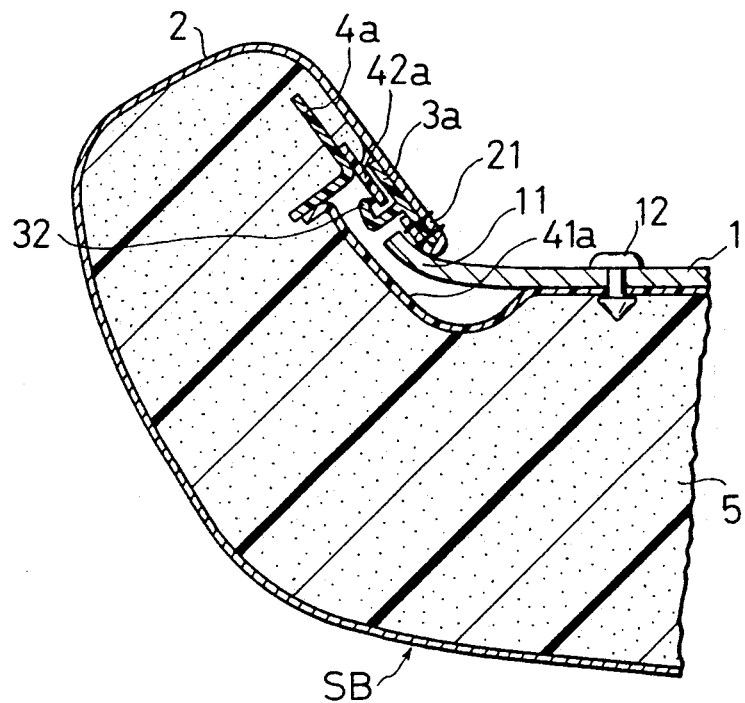
FIG. 6 is a partial sectional view of a second embodiment in the present invention.
Figure 7:
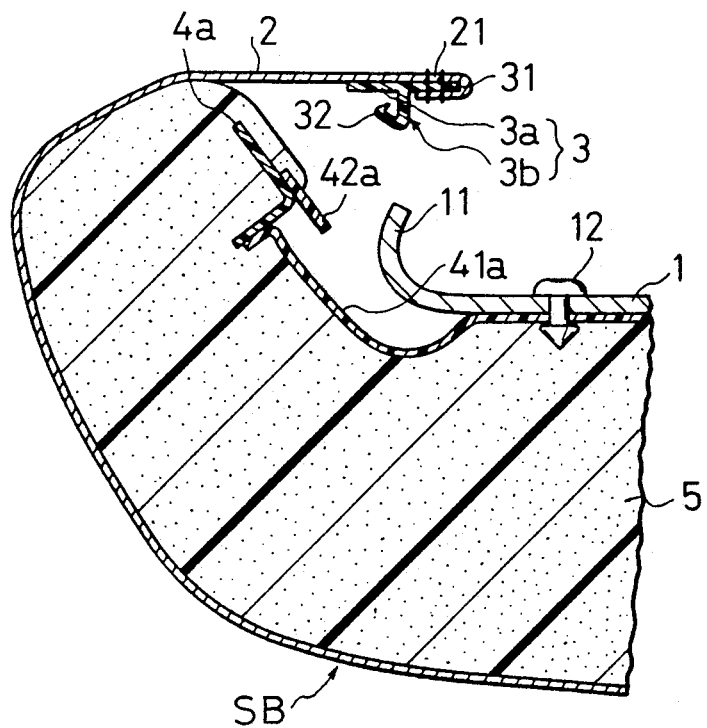
FIG. 7 is a partly exploded, partial sectional view of the second embodiment.

Referring now to FIGS. 6 and 7, there is shown a second embodiment of the present invention.

In this particular embodiment, while the covering and foam cushion member (2)(5) as well as the anchor member (3) are identical to those of the above-described first embodiment, yet there is a large recess (41a) in the upper end part of the seat back (SB), a frame (4a) of L-shaped configuration in section is partly embedded in the foam cushion member (5) such that the lower section of the frame (4a) is exposed, and a projecting member, in this case a stopper plate, (42a ) is fixed to the upper section of the frame (4a) in a manner projecting over the recess (41).

Designation (41a) denotes a back frame which is attached at t surface of the seat back (SB). The back frame (41a)is therefore bent in a generally U-shaped form at its upper part to define such recess (41). As shown, the carpet (1) lies upon the back frame (41a) and is secured thereto by means of the clip (12) as is the case in the first embodiment.

With such structure, as can be seen from FIGS. 6 and 7, the plate section (3a) of the anchor member (3) is firstly hookingly engaged over the stopper plate (42), to thus securely anchor the end of the covering member (2) to the reverse side of the seat back (SB), and thereafter, the terminal end of the carpet ie inserted into the opening between the end of the covering member (2) and the recess. Accordingly, it is much easier to set the terminal end (11) of the carpet (I) at the securing point at (41a).

It should be understood the present invention is not limited to the illustrated embodiments, but any other modifications, replacements and additions may structurally be possible without departing from the spirit and scope of the appended claims.

What is claimed is:

1. A structure for fixing a terminal end of a carpet in an automotive seat, in which a seat back of said seat has a rear side as part of said seat back to be used as a load-carrying platform and the carpet is attached to said rear side of said seat back, and said structure comprising:
a recessed area formed in said rear side of said seat back, in which recessed area has a projecting member;
an anchor member of a generally T-shaped configuration in section, which is fixed to an end of a covering member affixed over a frontal side of said seat back, said anchor member comprising a horizontal plate area and an engagement portion projecting from said horizontal plate area, said horizontal plate area having a securing part for securing a terminal end of said carpet in said recessed area;
wherein, said engagement portion of said anchor member is engaged with said projecting member at said recessed area, said terminal end of said carpet is pressed down by said securing part of said anchor member, so as to secure said end of said covering member and terminal end of said carpet into said recessed area, whereby the carpet is positively fixed to said rear side of said seat back.

2. The structure as defined in claim 1, wherein said end of said covering member is sewn to an outer surface of said horizontal plate area of said anchor member, and wherein said engagement portion of said anchor member is disposed at a central point of said horizontal plate area, comprising a hook-like engagement portion to be hookingly engaged with said projecting member.

3. The structure as defined in claim 1, wherein one half region of said horizontal plate area constitutes said securing portion by which said terminal end of said carpet is pressed down into said recessed area and secured therein.

4. The structure as defined in claim 1, further including a back frame which includes said recessed area and said projecting member, and wherein said projecting member is a hook portion which is adapted to engage said engagement portion of said anchor member.

5. The structure as defined in claim 1, further including a back frame comprising an L-shaped plate and wherein said projecting member extends from said L-shaped plate, said projecting member having one end which is adapted to be engaged by said engagement portion of said anchor member and another end which is affixed to said back frame.

6. The structure as defined in claim 5, wherein there is further provided a second frame at said rear side of said seat back, independent of said back frame.

* * * * *